(No Model.)  3 Sheets—Sheet 1.
G. & W. ROSS.
WATER ENGINE.
No. 375,200.  Patented Dec. 20, 1887.
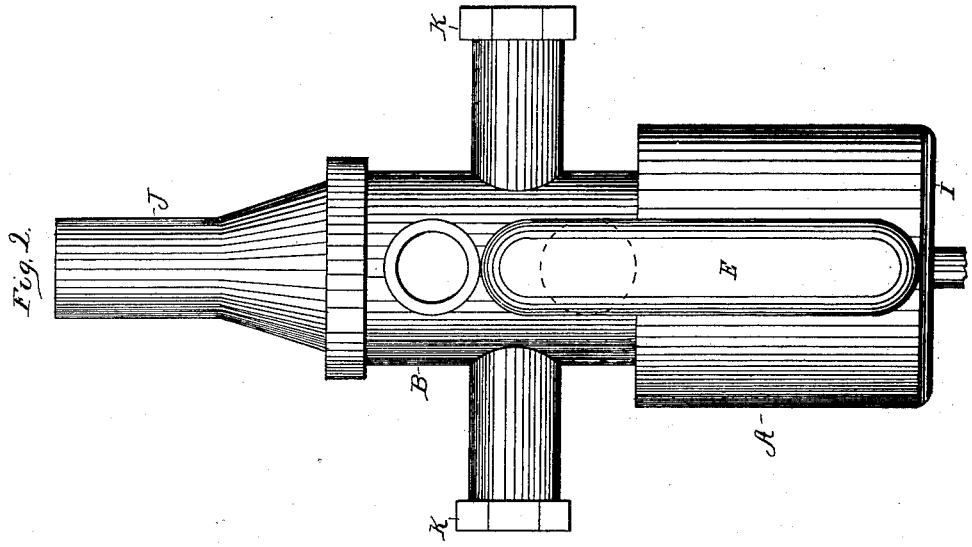
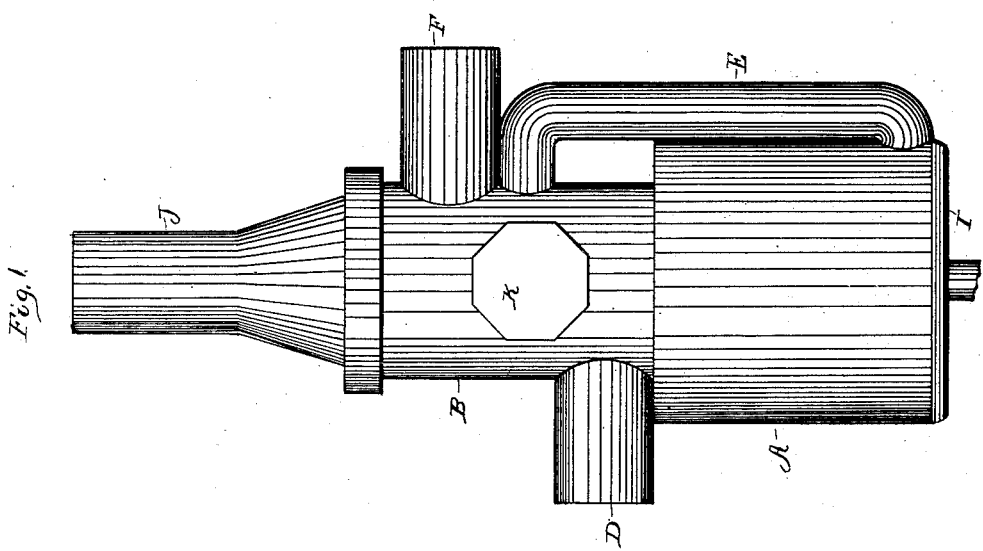
WITNESSES:  
INVENTORS  
George Ross  
William Ross  
BY  
Geo. Mosher  
ATTORNEY (No Model.) 3 Sheets—Sheet 2.
G. & W. ROSS.
WATER ENGINE.
No. 375,200. Patented Dec. 20, 1887.
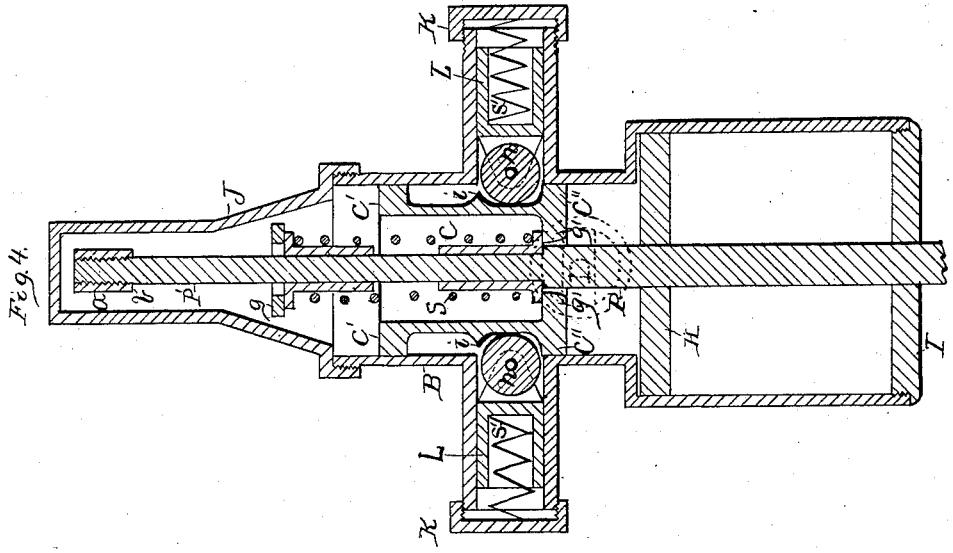
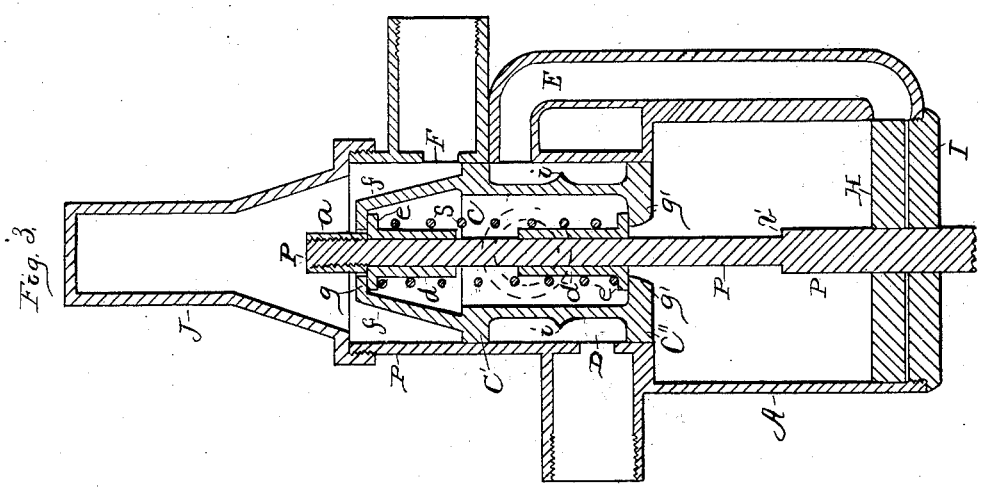
WITNESSES:
INVENTORS
George Ross
William Ross
BY
Geo. A. Mosher
ATTORNEY (No Model.) 3 Sheets—Sheet 3.
G. & W. ROSS.
WATER ENGINE.
No. 375,200. Patented Dec. 20, 1887.
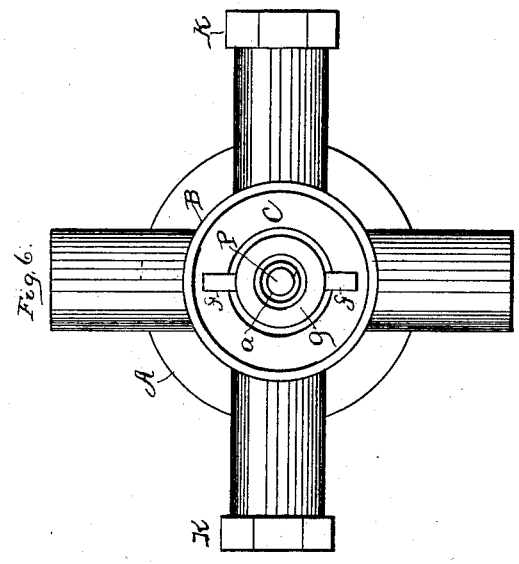
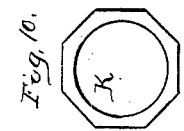
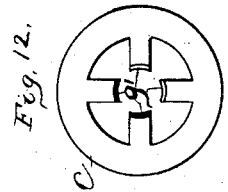
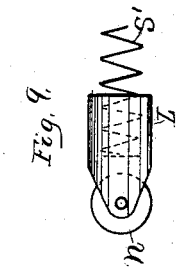
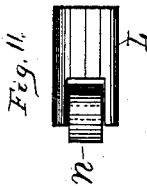
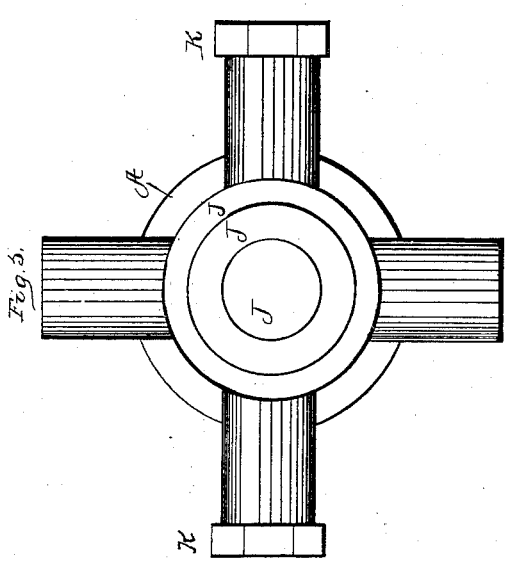
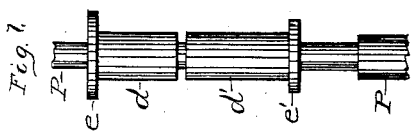
WITNESSES:
N. Davenport
Wm H Hallister Jr
George Ross  INVENTORS
William Ross
BY
Geo. A Mosher
ATTORNEY
N. PETERS, Photo-Lithographer, Washington, D. C.

UNITED STATES PATENT OFFICE.

GEORGE ROSS AND WILLIAM ROSS, OF TROY, NEW YORK.

WATER-ENGINE.

SPECIFICATION forming part of Letters Patent No. 375,200, dated December 20, 1887.

Application filed April 9, 1885. Renewed April 20, 1887. Serial No. 235,490. (No model.)

*To all whom it may concern:*

Be it known that we, GEORGE ROSS and WILLIAM ROSS, residents of the city of Troy, in the county of Rensselaer and State of New York, have invented certain new and useful Improvements in Water-Engines; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

Our invention relates to improvements in water-engines.

Our invention is partly an improvement upon the construction shown and described in Letters Patent of the United States issued to George Ross, one of the present applicants, on the 25th day of March, 1884, for improvements in air-pumps, and numbered 295,676.

Figures 1 and 2 of the drawings are side and front elevations of our improved water-engine. Figs. 3 and 4 are vertical central sections taken on planes at right angles to each other. Fig. 5 is a top plan view of the device as shown in Fig. 2. Fig. 6 is same view with the top cap removed. Fig. 7 is a side elevation showing a portion of piston-stem inserted within the valve-trips. Fig. 8 is the spring controlling the valve-trips. Fig. 9 is a side view of detaining-latch. Fig. 10 is a plan view of inside of cap. Fig. 11 is a plan view of detaining-latch. Fig. 12 is a plan view of bottom of valve.

A is the cylinder, provided with piston H and rod passing out through head I, and an oppositely-projecting stem or rod, P, passing up into the valve-chamber within the casing B, which is preferably cast integral with the cylinder. The cap J may also be cast integral with A and B, or screwed onto B, as shown, to facilitate access to the valve.

C is the valve, cylindrical in form, and adapted to fit and slide in the chamber of case B, which forms an extension of the chamber within cylinder A. The valve-case is provided with the induction-port D, eduction-port F, and opening to run around duct E. The valve is in form a cylindrical shell, having the upper disk, C', and the lower disk, C'', which may be packed to closely fit the valve-chamber. Between the disks the body of the valve is cut away to allow of free passage of water or other fluid around the valve between the disks. About midway between the disks is located a projecting ledge or stop adapted to engage with the rollers $n$ of the detaining-latches L L on opposite sides of the valve, as shown in Fig. 4. The latches are controlled by the springs S, one end of a spring being seated within the latch-stem and the other upon the threaded cap K, adapted to be screwed onto the latch-containing tube, the tension of the spring being adjusted by turning on or off the cap. The latch-stem is free to slide within its containing-tube when the tension of its controlling-spring is overcome. The valve is provided at its lower end with the inwardly-projecting supports $g'$, (shown in Figs. 3, 4, and 12,) which serve to support the valve-trip $d'$, having the projecting circular flange $e'$, adapted to rest on projections $g'$. Trip $d'$ is in the nature of a sleeve, and is adapted to receive the stem P and loosely slide thereon. A similar trip, $d$, is provided with flange $e$, which rests upon an annulus supported above the valve-disks by arms $f f$, the two trips $d$ and $d'$ being forced and detained apart by spring S, encircling the trips and resting, one end upon flange $e$ and the other end upon flange $e'$.

The upper portion of stem P is of smaller diameter, forming the lower stop, $b'$, and is provided at its upper end with stop $a$ in the nature of a threaded sleeve, which may be adjustably screwed onto the upper end of the stem, threaded for that purpose. The upper stop is sufficiently small in diameter to pass down through the annulus $g$ to contact with trip $d$, and the stop $b'$ is also adapted to pass up through the space between projections $g'$ to contact with trip $d'$. It is evident, therefore, that when the parts are in the position shown in Fig. 3 the water will enter at port D, pass around the valve through duct E into the cylinder beneath the piston H, and force the latter, with its stem P, upward until stop $b'$ strikes the trip $d'$, the water above the piston passing through the valve and out at F. Still advancing, it forces trip $d'$ up against the spring S, which yields until its force exerted through trip $d$ upon the annulus $g$ to lift the valve is almost sufficient to overcome the detaining force of the latches L, when trip $d'$ strikes trip $d$ and overcomes the detaining force of the latches, whereupon the valve quickly slides up to the position shown in Fig. 4, the disk $C''$ sliding up past the port D and the disk $C'$ up past the port F, thereby opening communication between E and F and between port D and the upper side of the piston, the latter being situated as shown in Fig. 4. The water then enters port D, forcing the piston and stem down and the water below the piston out through duct E and port F until stop $a$, in its descent, strikes trip $d$ and forces it against spring S until the detaining force of the latches is again overcome, and the valve quickly slides back to the position shown in Fig. 3, the operation being continued so long as water is admitted at port D.

As the water is free to pass through the central orifice in the valve from end to end, it is always balanced and free to slide.

By turning back the caps K the detaining-latch springs are weakened, and can be so weakened that the force of springs S would be sufficient to overcome the detaining force of the latches and slide the valve without contact of trips $d'$ and $d$ with each other; but the time of movement would be more uncertain, rendering the length of piston stroke uneven. By relying upon contact with each other of the trips a uniform movement of the valve and piston is secured quickly, for the reason that the friction upon the axle of the rollers is so slight that the pressure of the rollers against the incline of the ledge $i$ tends to hasten forward the valve instead of retard it, as was often the case with fixed point latches.

We prefer to cast tube E integral with A and B, and by casting A and B in one piece the machine is rendered stronger and more compact, and it can be produced much more cheaply than when the cylinder and valve-casings are cast in separate pieces.

We do not wish to limit the control of latches L to springs, as weights might be employed to serve the same purpose.

What we claim as new, and desire to secure by Letters Patent, is—

1. The combination, with the casing B, having tubular projections, of the intermediately cut-away valve C, having the ledge $i$, the rolls $n$, and the sliding spring-latches L, as and for the purpose described.

2. The combination of a piston-rod having stops $b$ $b'$, a hollow valve, C, having inward projections $g$ $g'$, the spring S, and the sleeve-trips $d$ $d'$, flanged at $e$ $e'$, as and for the purpose specified.

In testimony whereof we have hereunto set our hands this 3d day of April, 1885.

GEORGE ROSS.
WILLIAM ROSS.

Witnesses:
GEO. A. MOSHER,
JOHN T. BOOTH.